United States Patent
Ichiyanagi

(10) Patent No.: US 7,326,920 B2
(45) Date of Patent: Feb. 5, 2008

(54) MULTI FUNCTION PERIPHERAL HAVING RADIO READER AND WRITER FOR COMMUNICATING WITH IC CHIPS

(75) Inventor: Toshimitsu Ichiyanagi, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 115 days.

(21) Appl. No.: 10/743,491

(22) Filed: Dec. 23, 2003

(65) Prior Publication Data

US 2005/0133707 A1 Jun. 23, 2005

(51) Int. Cl.
*H01J 3/14* (2006.01)
(52) U.S. Cl. ...................................... 250/234
(58) Field of Classification Search .............. 250/234, 250/556; 358/409
See application file for complete search history.

(56) References Cited

U.S. PATENT DOCUMENTS 6,464,139 B1 * 10/2002 Wilz et al. ............. 235/462.01
2002/0163579 A1 * 11/2002 Patel et al. ............... 348/207.1
2003/0133153 A1 * 7/2003 Shinoda ..................... 358/1.15
2003/0164974 A1 * 9/2003 Yoda .......................... 358/1.15

FOREIGN PATENT DOCUMENTS

| JP | 6-22062 A | 1/1994 |
| JP | 6-098051 A | 4/1994 |
| JP | 2002-135507 A | 5/2002 |

* cited by examiner

*Primary Examiner*—Georgia Epps
*Assistant Examiner*—Kevin Wyatt
(74) *Attorney, Agent, or Firm*—Foley & Lardner LLP

(57) ABSTRACT

A copying machine of the present invention has a scanner including an optical reading unit which optically scans a surface of an original and converts an image on the surface of the original into image data, and a radio communication unit which carries out radio communication with an IC chip having a radio communication function, and a printer including an image forming unit which prints an image on a surface of an image forming medium, and a radio communication unit which carries out radio communication with an IC chip having a radio communication function.

17 Claims, 6 Drawing Sheets

MULTI FUNCTION PERIPHERAL HAVING RADIO READER AND WRITER FOR COMMUNICATING WITH IC CHIPS

BACKGROUND OF THE INVENTION

1. Field of the Invention

The present invention relates to a scanner, a printer, and a copying machine to be used for a digital multi functional peripheral having, for example, a scanner function, a printer function, a copy function, and a network communication function.

2. Description of the Related Art

Conventionally, with respect to copying machines, an art in which copies of classified papers or the like are managed has been proposed. For example, in Jpn. Pat. Appln. KOKAI Publication No. 06-22062, an art is described in which additional information such as the document name, the page number, and the like of an original are acquired by using radio wave from a code transmitter built in an original such as a classified paper, and the additional information is recorded on an image forming medium as the result of copying with respect to the original. However, in the art described in the above-described Jpn. Pat. Appln. KOKAI Publication No. 06-22062, a data amount which can be recorded as additional information on an image forming medium is small. Therefore, the data which can be recorded as additional information on an image forming medium are limited to information, such as the document name, the page number, and the like of an original, whose amount of data is small.

Further, in the conventional copying art, an image on an original is optically read by a scanner, and a printer carries out image forming processing on the basis of image data optically read by the scanner. Therefore, when plural times of copying are carried out, the quality of the image as the printed result deteriorates due to the resolution of the scanner or the like. In addition, when a new original is prepared by processing the image on the original, it is necessary to cut and paste on the original by the hands, or to process the image data read by the scanner. Moreover, conventionally, when a printed matter and the electronic data relating to the printed matter are distributed, the printed matter and the electronic data relating to the printed matter must be separately distributed. Therefore, conventionally, it has taken time to separately manage the printed matter and the electronic data relating to the printed matter.

BRIEF SUMMARY OF THE INVENTION

In order to solve the problems as described above, an object of the present invention is to provide a scanner which can collectively read image data obtained by optically scanning the surface of an original and electronic data relating to the original, a printer which can print an image on an image forming medium and which can record electronic data including the image data printed on the image forming medium, and a copying machine which can print an image on the image forming medium by using the image on the surface of the original or the electronic data relating to the original.

The scanner of the present invention has: an optical reading unit which optically scans a surface of an original and converts an image on the surface of the original into image data; a radio communication unit which, at the time of scanning the original in which an IC chip having a radio communication function is embedded, by the optical reading unit, carries out radio communication with the IC chip; and a control unit which optically scans the surface of the original by the optical reading unit and converts the image on the surface of the original into image data when scanning of the original in which the IC chip having a radio communication function has been embedded is requested, and reads electric data recorded in a memory in the IC chip built in the original, by the radio communication unit.

The printer of the present invention has: an image forming unit which prints an image on a surface of an image forming medium; a radio communication unit which, at the time of printing an image on the image forming medium in which an IC chip having a radio communication function is embedded, by the image forming unit, carries out radio communication with the IC chip; and a control unit which, when image data to be printed on the image forming medium in which the IC chip having a radio communication function has been embedded is inputted thereto, prints an image based on the image data on the image forming medium by the image forming unit, and records the image data as electric data, by the radio communication unit, in a memory in the IC chip embedded in the image forming medium.

The copying machine of the present invention has: an optical reading unit which optically scans a surface of an original, and converts an image on the surface of the original into image data; an image forming unit which prints an image on a surface of an image forming medium; a radio communication unit which carries out radio communication with an IC chip embedded in the original or the image forming medium and having a radio communication function; and a control unit which carries out scanning of the original by the optical reading unit or printing on the image forming medium by the image forming unit, and carries out reading or writing of electronic data, by the radio communication unit, with respect to a memory in the IC chip embedded in the original or the image forming medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be described with reference to the drawings.

Figure 1:
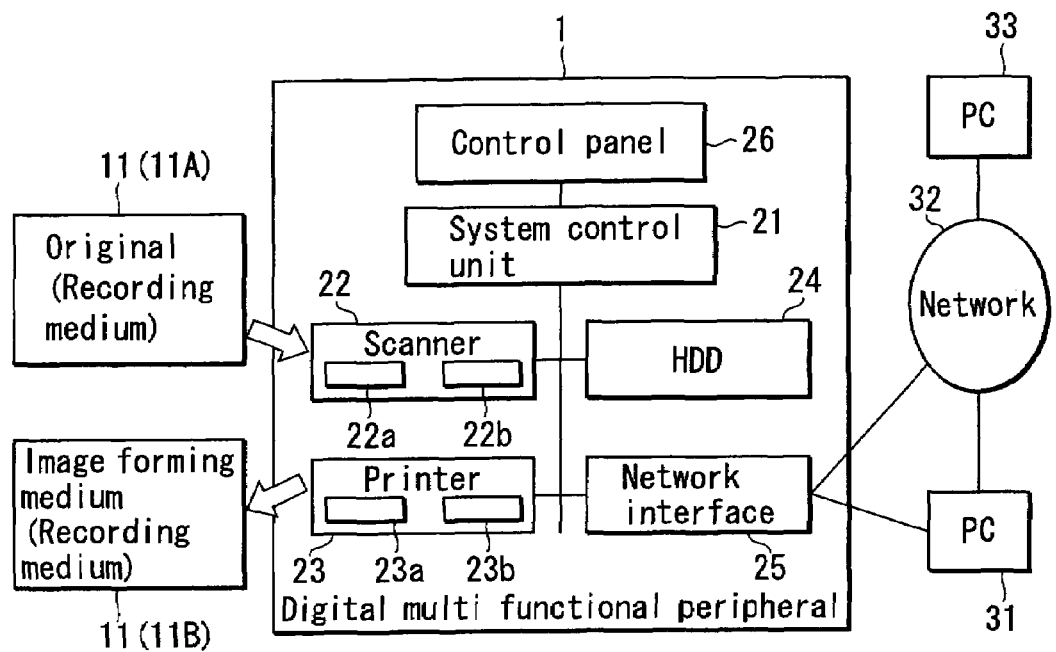
FIG. 1 is a block diagram showing a schematic configuration of a digital multi functional peripheral functioning as a scanner, a printer, and a copying machine of the present invention.

FIG. 1 is a block diagram showing a schematic configuration of a digital multi functional peripheral functioning as a scanner, a printer, and a copying machine according to the embodiment of the invention. A digital multi functional peripheral 1 shown in FIG. 1 has a function of carrying out processings such as scanning, printing, copying, and the like by using a recording medium (an original or an image forming medium) 11 in which an antenna 41 and an IC chip 42 for radio communication, which will be described later, have been embedded.

As shown in FIG. 1, the digital multi functional peripheral 1 has a system control unit 21, a scanner 22, a printer 23, a hard disk drive (HDD) 24, a network interface 25, a control panel 26, and the like.

The system control unit 21 carries out control of the entire digital multi functional peripheral 1. When the digital multi functional peripheral 1 is used as a scanner, the system control unit 21 functions as a control unit of the scanner by controlling the scanner 22, the HDD 24, the network interface 25, the control panel 26, and the like. Further, when the digital multi functional peripheral 1 is used as a printer, the system control unit 21 functions as a control unit of the printer by controlling the printer 23, the HDD 24, the network interface 25, the control panel 26, and the like. Moreover, when the digital multi functional peripheral 1 is used as a copying machine, the system control unit 21 functions as a control unit of the copying machine by controlling the scanner 22, the printer 23, the HDD 24, the network interface 25, the control panel 26, and the like.

The scanner 22 has an optical reading unit (scanning unit) 22a for optically scanning an image on an original, and a radio reader/writer 22b for carrying out radio communication.

The optical reading unit 22a optically scans the image printed on a surface of an original 11A which is set at a predetermined original reading position, and converts the image into image data. The radio reader/writer 22b carries out transmission/reception of data to/from a radio device (a radio device including the antenna 41 and the IC chip 42 embedded in the original 11A). The radio reader/writer 22b is configured of, for example, an antenna for radio communication and a communication control unit for controlling radio communication. Further, the radio reader/writer 22b is installed at a position where radio communication is possible with respect to the original 11A set at the predetermined original reading position. For example, the radio reader/writer 22b is installed at an original cover functioning as an original presser for the original to be scanned, or the like.

In accordance with the above-described configuration, the scanner 22 achieves the function of optically scanning the image on the recording medium 11 (the original 11A) and converting the image into image data, and of reading (or writing) electronic data recorded in a memory 52 in the IC chip 42.

The printer 23 has an image forming unit (printing unit) 23a at which an image is formed on an image forming medium 11B, and a radio reader/writer 23b for carrying out radio communication. The image forming unit 23a prints an image based on image data serving as printing data on the image forming medium 11B fed from a containing unit (not shown).

The radio reader/writer 23b carries out transmission/reception of data to/from a radio device (a radio device including the antenna 41 and the IC chip 42 embedded in the image forming medium 11B). The radio reader/writer 23b is configured of, for example, an antenna for radio communication and a communication control unit for controlling radio communication. Further, the radio reader/writer 23b is installed at a position where radio communication is possible with respect to the image forming medium 11B on which the image has been printed by the image forming unit 23a. For example, the radio reader/writer 23b is installed in the vicinity of a position for feeding paper of the image forming medium 11B on which the image is to be printed, or in the vicinity of an ejection opening from which the image forming medium 11B on which the image has been printed is ejected.

Note that the radio reader/writer 22b of the scanner 22 and the radio reader/writer 23b of the printer 23 may be made to be in common in accordance with the characteristic such as a range that the IC chips 42 of the original 11A and the image forming medium 11B are capable of radio communication, or the like. Namely, provided that both of the IC chip 42 of the original 11A and the IC chip 42 of the image forming medium 11B are capable of radio communication, the radio reader/writer 22b and the radio reader/writer 23b may be configured of one radio reader/writer.

In accordance with the above-described configuration, the printer 23 achieves the function of printing the image on the recording medium 11 (the image forming medium 11B), and of writing (or reading) electronic data on (or from) the memory 52 in the IC chip 42.

The HDD 24 is a large capacity storage device. The HDD 24 stores the image data optically read at the optical reading unit 22a, the electronic data read at the radio reader/writer 22b, and the data read via the above-described network interface 25, etc.

The network interface 25 is an interface for carrying out transmission/reception of data between the digital multi functional peripheral 1 and a personal computer (PC) 31 serving as an external device, and a personal computer (PC) 32 serving as an external device a network 32.

The control panel 26 functions as a user interface for receiving various operating instructions from a user. The control panel 26 includes, for example, a touch panel built-in liquid crystal display, and the like.

Figure 2:
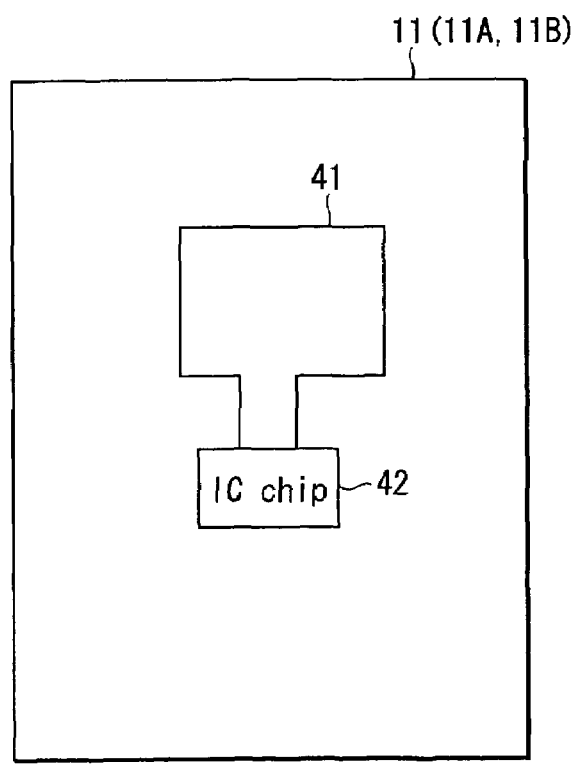
FIG. 2 is a diagram schematically showing a configuration of a recording medium to be used as an original or an image forming medium for the digital multi functional peripheral.

FIG. 2 is a diagram showing a configuration example of the recording medium (an original, an image forming medium) 11 having the antenna 41 and the IC chip 42 for radio communication which are used for the digital multi functional peripheral built therein.

The recording medium 11 shown in FIG. 2 is a recording medium used as the original 11A or the image forming medium 11B at the digital multi functional peripheral 1. In recent years, making an IC chip for radio communication having a memory to be miniaturized and highly-performance has progressed. Accordingly, the IC chip as described above can be built in a paper used as an original or an image forming medium at a scanner, a printer, a copying machine, or the like.

Namely, when the digital multi functional peripheral 1 functions as a scanner, the image recording medium 11 is used as the original 11A. Further, when the digital multi functional peripheral 1 functions as the printer 23, the image recording medium 11 is used as the image forming medium 11B. When the digital multi functional peripheral 1 functions as a copying machine, the image recording medium 11 is used as the original 11A, and as the image forming medium 11B as well.

The image recording medium 11 is a printing paper having the antenna 41 and the IC chip 42 built therein. In addition, the image recording medium 11 is formed from, for example, a paper of a size (letter, legal, A3, A4, A5, B3, B4, and B5) which is printed by a normal printer. On the recording medium 11, an image according to a paper size is printed on the surface of the recording medium 11, and electronic data is recorded in the memory in the IC chip 42.

Figure 3:
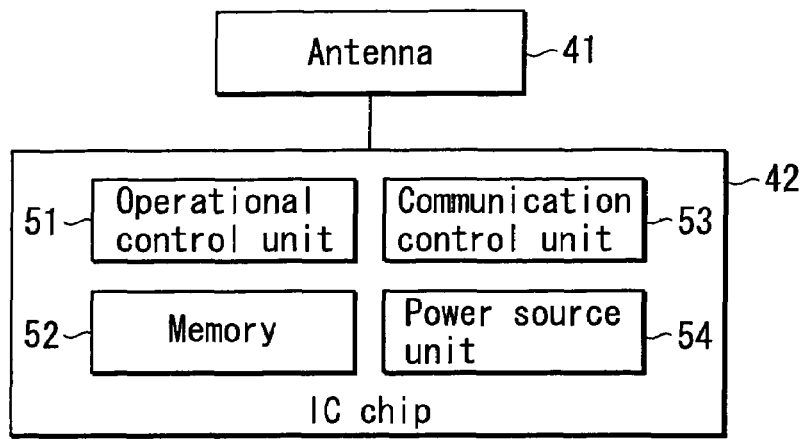
FIG. 3 is a block diagram schematically showing a configuration in an IC chip embedded in the recording medium.

FIG. 3 is a block diagram schematically showing a configuration example in the IC chip 42.

The antenna 41 carries out transmission and reception of radio wave. As shown in FIG. 3, the IC chip 42 has an operational control unit 51, a memory 52, a communication control unit 53, a power source unit 54, and the like.

The operational control unit 51 is a module for controlling the operation of the IC chip. The memory 52 is a module for recording electronic data. Various data relating to the image printed on the recording medium 11 are recorded in the above-described memory 52. For example, in the memory 52, the image data of the image printed on the recording medium 11, the digital photographic data which is the source of the image printed on the recording medium 11, text data which becomes the source of the image printed on the recording medium 11, the electronic data such as additional information with respect to the image printed on the recording medium 11 are recorded. The memory 52 has, at least, a storage capacity for recording the data of the image printed on the surface of the recording medium 11 as electronic data, and recording the additional information with respect to the recording medium 11.

The communication control unit 53 is a module for controlling radio communication using the antenna 41. The power source unit 54 is a module for generating power source voltage from the radio wave received from the antenna 41. Further, the power source unit 54 supplies the power source voltage generated from the radio wave received by the antenna 41, to the respective portions in the IC chip.

With respect to the recording medium 11 having the configuration as described above, the image is printed on the surface (page space), and the electronic data is held in the memory 52 in the IC chip 42. Further, the electronic data recorded in the memory 52 is read and written by the reader/writers 22b and 23b capable of radio communication with the IC chip 42.

Next, operations of the digital multi functional peripheral 1 with respect to the recording medium 11 will be described.

First, the operations as a scanner of the digital multi functional peripheral 1 by using the original 11A as the recording medium 11 will be described.

Figure 4:
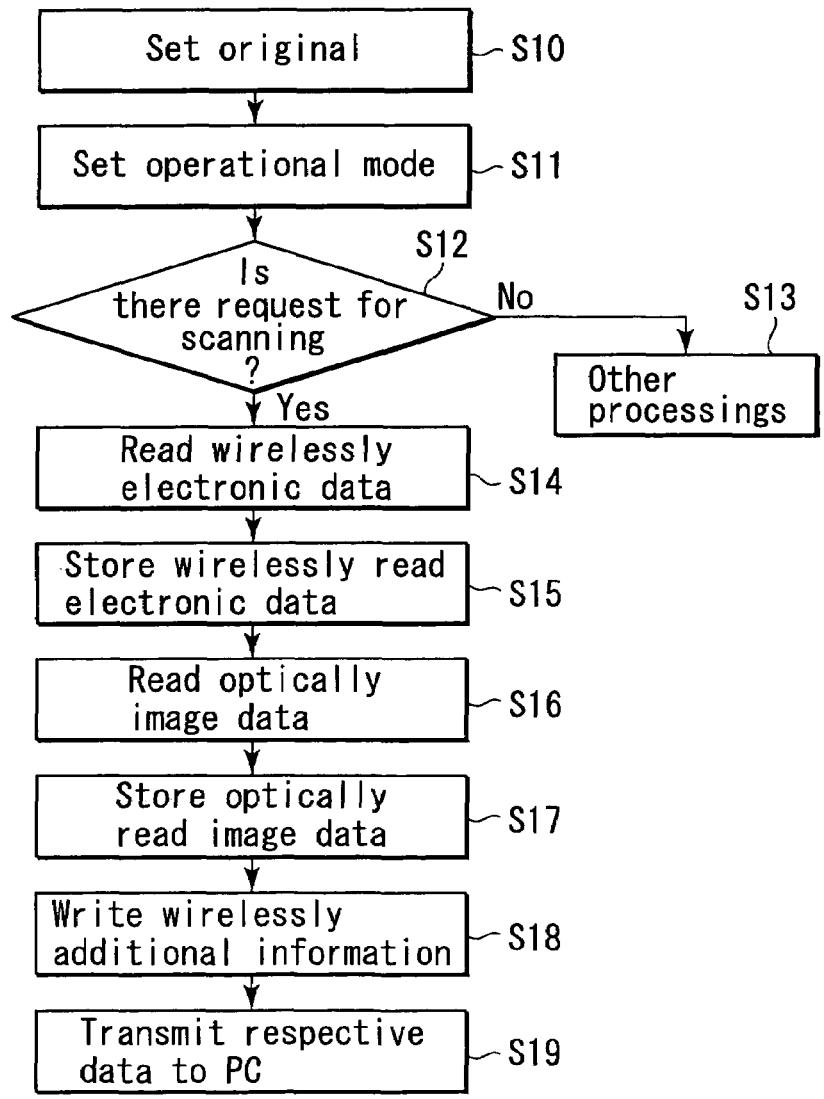
FIG. 4 is a flowchart for explanation of an operational example when the digital multi functional peripheral is used as a scanner.

FIG. 4 is a flowchart for explanation of the operations as the scanner of the digital multi functional peripheral 1 with respect to the original 11A.

As shown in FIG. 4, first, the user sets the original 11A to a predetermined position of the digital multi functional peripheral 1 (step S10). It will be described such that the original 11A is to be set on an original placing platform. If the scanner of the digital multi functional peripheral 1 has a automatic document feeder (ADF), the original 11A may be set on an original platform of the ADF. In this case, the original 11A is conveyed to a predetermined reading position by the ADF.

After the original 11A is set, the user instructs a reading mode (an operational mode) of the original by the control panel 26. Here, the user selects a scanning mode, a transfer address of the scanned data, and the like by the control panel 26.

Note that, when only the image data that the image on the original 11A is optically scanned and read by the optical reading unit 22a (hereinafter, optically read image data as well) is required, or when only the electronic data recorded in the memory 52 in the IC chip 42 embedded in the original 11A (hereinafter, simply electronic data) is required, it may be configured such that the user can designate the purport by the control panel 26. In this case, the system control unit 21 reads only the data designated by using the scanner 22 by the user.

The system control unit 21 sets an operational mode in accordance with the operational mode instructed by using the control panel 26 by the user (step S11). When the operational mode is set, the system control unit 21 starts scanning processing on the basis of an instruction of a scanning start by the control panel 26 (step S12, YES). Note that, in the case of an operational mode other than the scanning mode (step S12, NO), the system control unit 21 executes the other processings (step S13).

After the scanning processing is started, the system control unit 21 carries out processing of reading the electronic data recorded in the memory 52 in the IC chip 42 embedded in the original 11A, by the radio reader/writer 22b (step S14).

The processing of reading the electronic data is carried out in accordance with the following procedure. First, the system control unit 21 transmits radio wave by the radio reader/writer 22b, and starts the IC chip 42 embedded in the original 11A. On the other hand, at the original 11A, the wave from the radio reader/writer 22b is received by the antenna 41, power source voltage is generated, and the respective portions in the IC chip 42 are made to start. In accordance therewith, the reader/writer 22b and the IC chip 42 of the original 11A are made to be in a state of being capable of radio communication.

In this sate, the radio reader/writer 22b transmits a request for transmission of the electronic data recorded in the memory 52 in the IC chip 42, with respect to the original 11A. In response to the request for transmission of the electronic data, the operation control unit 51 in the IC chip 42 transmits the electronic data recorded in the memory 52 in the IC chip 42, to the radio reader/writer 22b by the antenna 41 and the communication control unit 53. At the radio reader/writer 22b, the electronic data transmitted from the IC chip 42 of the original 11A is received in accordance with the request for transmission of the electronic data. According to the above-described procedure, the processing of reading the electronic data recorded in the memory 52 embedded in the original 11A is carried out.

The data read by the reading processing by means of the radio reader/writer 22b as described above (wirelessly read electronic data) is supplied from the scanner 22 to the system control unit 21. The system control unit 21 stores the wirelessly read electronic data supplied from the scanner 22 in a memory such as the HDD 24 (step S15).

In addition, the system control unit 21 executes the processing, as well, in which the image on the original 11A set at the predetermined position is optically read by the optical reading unit 22a. In this processing, the system control unit 21 optically scans the image on the original 11A set at the predetermined position, by the optical reading unit 22a, and converts the image into the image data (optically read image data) (step S16). The optically read image data is supplied from the scanner 22 to the system control unit 21. The system control unit 21 stores the optically read image data supplied from the scanner 22 in a memory such as the HDD 24 (step S17).

Note that the processings of reading electronic data by the radio reader/writer 22b (steps S14, S15) and the processings of optically reading image by the optical reading unit 22a (steps S16, S17) may be simultaneously carried out. Further, the processings of reading electronic data by the radio reader/writer 22b (steps S14, S15) may be carried out after the processings of optically reading image by the optical reading unit 22a (steps S16, S17).

Moreover, when using history information of the original 11A (information showing equipment by which the scanning processings have been carried out, the number of the scanning processings, the contents of the scanning processings, and the like) and the like are recorded as additional information, the system control unit 21 carries out the processing in which information showing the contents of the processings in steps S14 to S19, and the like is written as additional information on the original 11A (step S18). Note that, when the processing of writing the additional information on the original 11A is not carried out, the step S18 is omitted.

The processing of writing additional information is the processing in which the additional information is written in the memory 52 in the IC chip 42 embedded in the original 11A, by the radio reader/writer 22b. This writing processing is carried out according to the following procedure. First, the system control unit 21 generates additional information (information showing the contents of the processings) to be recorded on the original 11A. After the additional information is generated, the system control unit 21 transmits a request for writing of the additional information, with respect to the original 11A by the radio reader/writer 22b. In response to the request for writing of the additional information, the operation control unit 51 in the IC chip 42 of the original 11A records the additional information in the memory 52 in the IC chip 42. According to the above-described procedure, the processing of writing the additional information on the original (the memory 52 in the IC chip 42 embedded in the original 11A) 11A is carried out.

After the optically read image data of the original 11A and the wirelessly read electronic data of the original 11A are stored in the HDD 24, the system control unit 21 carries out transfer processing in which the optically read image data and the wirelessly read electronic data are respectively transferred to the PCs 31 and 33 serving as the external devices, which have been designated by the user (step S19). In the transfer processing, for example, the optically read image data and the wirelessly read electronic data are transferred as the separate files to the PCs designated by the user.

As described above, the scanner of the present embodiment has an optical reading unit which optically scans the surface of the original and converts an image on the surface of the original into image data, and a radio communication unit which carries out radio communication with an IC chip having a radio communication function, and when scanning of the original in which the IC chip having a radio communication function is embedded is required, the scanner optically scans the surface of the original by the optical reading unit and converts the image on the surface of the original into image data, and reads the electronic data recorded in a memory in the IC chip built in the original, by the radio communication unit. Accordingly, a scanner which can input a printed matter and electronic data relating to the printed matter from one medium can be provided.

Moreover, the scanner of the present embodiment has a function of recording the using history of the original as additional information in the memory embedded in the original when scanning processing is executed. In accordance therewith, information such as the using history of the original or the like can be easily verified, and the original can be prevented from being illegally used, or the using history of the original when the original is illegally used, or the like can be easily verified. Furthermore, the additional information as described above can be simply recorded without printing special information on the surface of the original, or carrying out complex processing on the original.

Next, operation of the digital multi functional peripheral 1 serving as a printer by using the image forming medium 11B as the recording medium 11 will be described.

Figure 5:
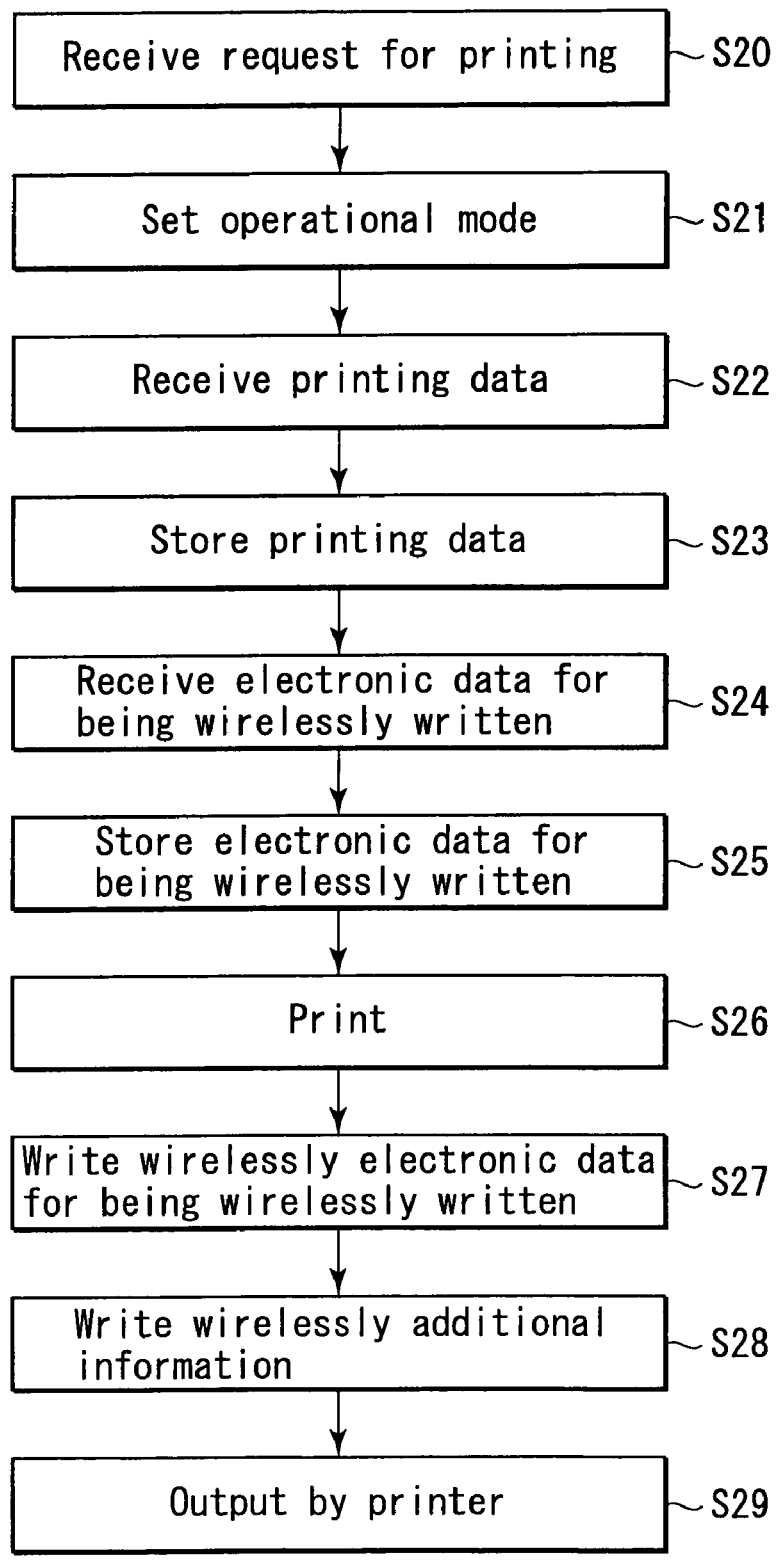
FIG. 5 is a flowchart for explanation of an operational example when the digital multi functional peripheral is used as a printer.
Figure 6:
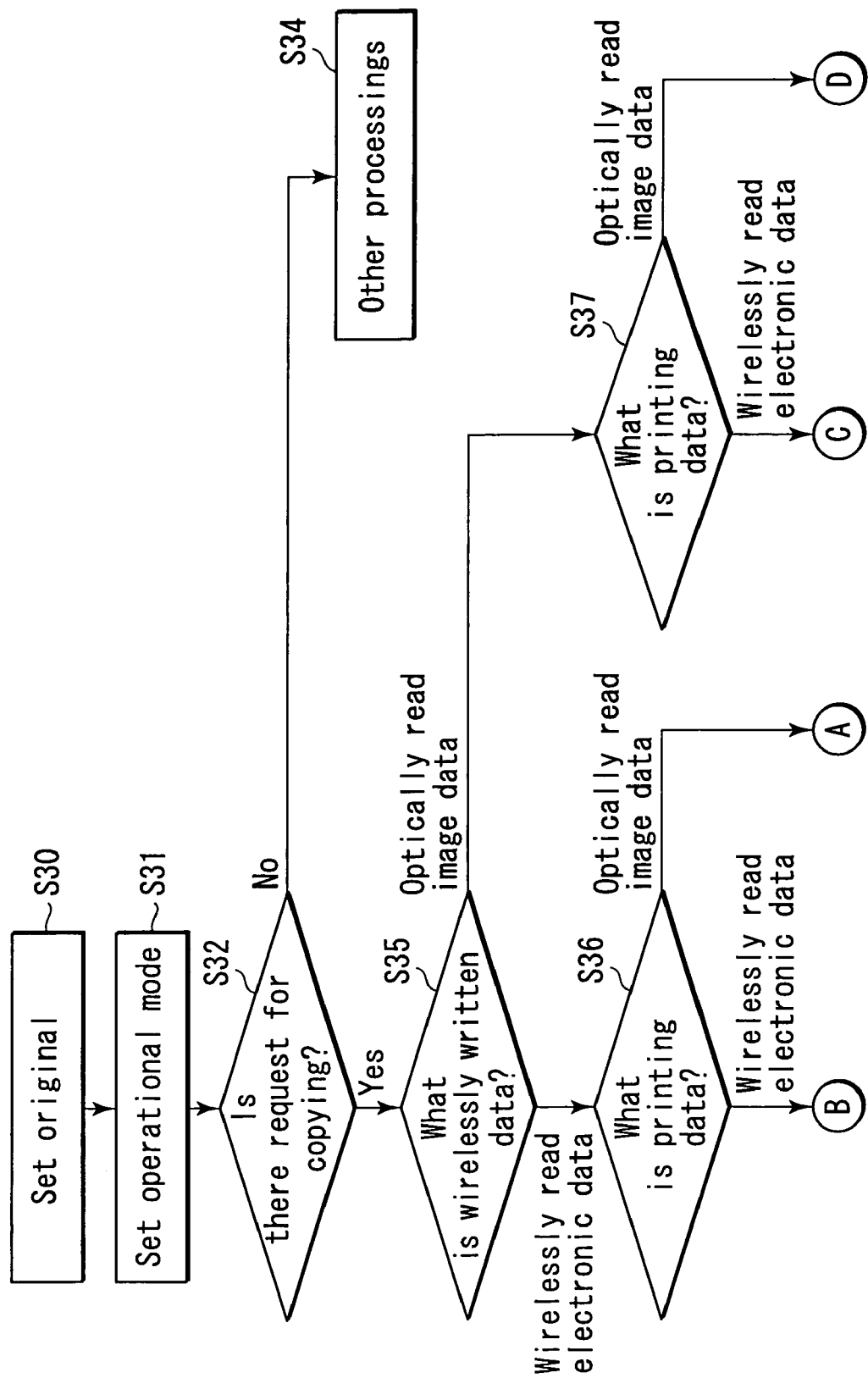
FIG. 6 is a flowchart for explanation of an operational example when the digital multi functional peripheral is used as a copying machine.
Figures 7, 8:
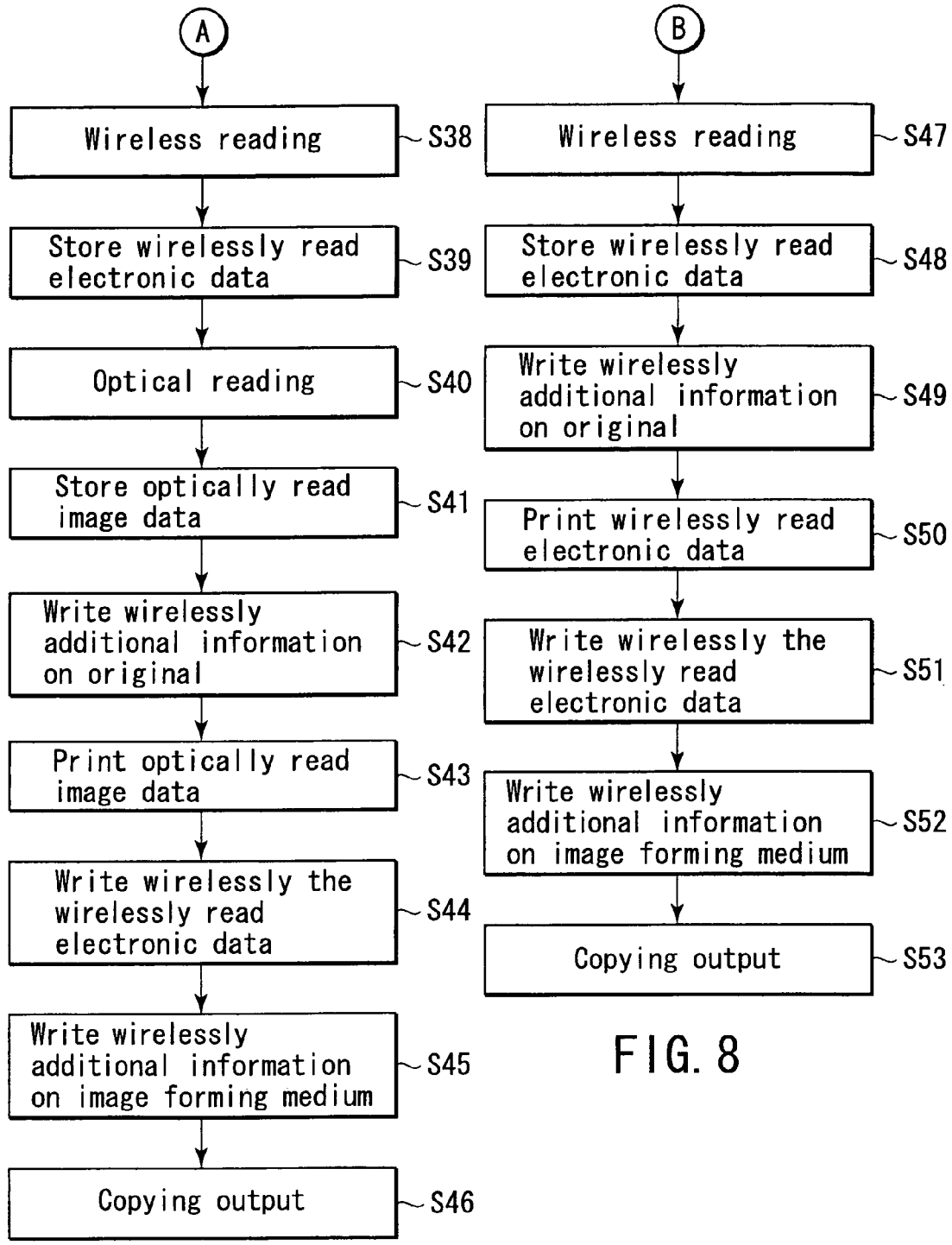
FIG. 7 is a flowchart for explanation of an operational example when the digital multi functional peripheral is used as the copying machine.
FIG. 8 is a flowchart for explanation of an operational example when the digital multi functional peripheral is used as the copying machine.
Figures 9, 10:
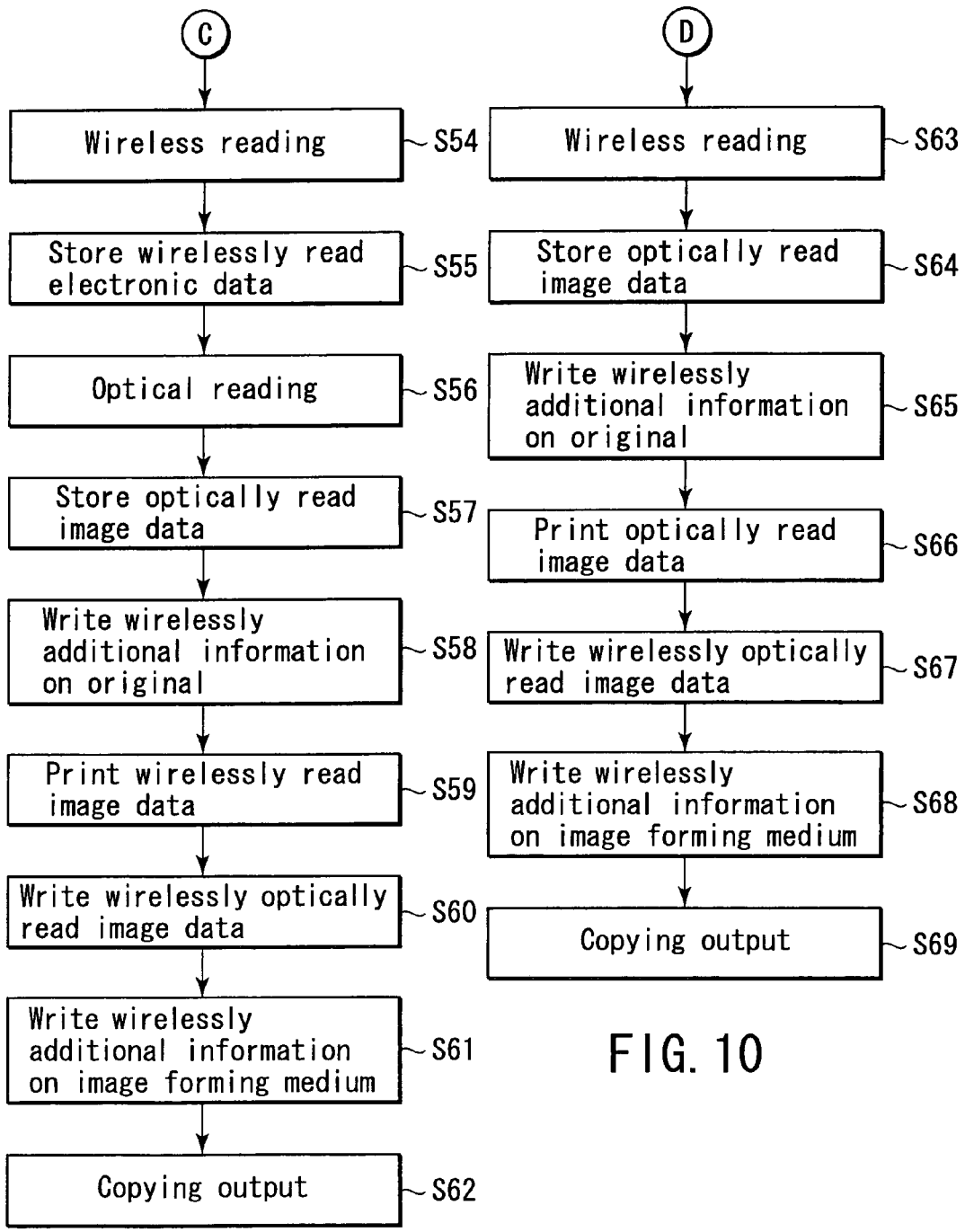
FIG. 9 is a flowchart for explanation of an operational example when the digital multi functional peripheral is used as the copying machine.
FIG. 10 is a flowchart for explanation of an operational example when the digital multi functional peripheral is used as the copying machine.

FIG. 5 is a flowchart for explanation of the operation of the digital multi functional peripheral 1 serving as the printer with respect to the image forming medium 11B.

As shown in FIG. 5, first, the user designates image data to be printed on the image forming medium 11B by the digital multi functional peripheral 1 (hereinafter, simply, printing data) and electronic data to be recorded in a memory in the IC chip 42 embedded in the image forming medium 11B (hereinafter, simply, electric data for being wirelessly written) on the PC 31 or the PC 33. Then, the PC 31 or the PC 33 requests printing with respect to the digital multi functional peripheral 1, and transmits the above-described printing data and electronic data for being wirelessly written.

At the digital multi functional peripheral 1, after the request for printing as described above is received (step S20), the system control unit 21 carries out setting of an operational mode corresponding to the request for printing (step S21). Further, the system control unit 21 receives the printing data and the electronic data for being wirelessly written which are transmitted from the PC 31 or the PC 33, by the network interface 25 (steps S22 and S24), and respectively stores the respective received data into a memory such as the HDD 24 (steps S23 and S25).

After the receiving of the printing data and the electronic data for being wirelessly written is completed, the system control unit 21 carries out printing processing in which an image based on the printing data is formed on the image forming medium 11B, by the image forming unit 23a of the printer 23 (step S26).

In addition to the printing processing, the system control unit 21 carries out writing processing in which the electronic data for being wirelessly written has been written in the memory 52 in the IC chip 42 embedded in the image forming medium 11B, by the reader/writer 23b of the printer 23 (step S27).

In the writing processing, first, the system control unit 21 transmits radio wave by the radio reader/writer 23b, and starts the IC chip 42 embedded in the image forming medium 11B. On the other hand, at the image forming medium 11B, the wave from the radio reader/writer 23b is received by the antenna 41, power source voltage is generated, and the respective portions at the inside of the IC chip 42 are started. As a result, the radio reader/writer 23b and the IC chip 42 of the image forming medium 11B are made to be in a state of being capable of radio communication.

In this state, the system control unit 21 transmits a request for writing of the electronic data for being wirelessly written, with respect to the image forming medium 11B, by the radio reader/writer 23b. In response to the request for writing, the operation control unit 51 in the IC chip 42 of the image forming medium 11B records the electronic data for being wirelessly written, in the memory 52 in the IC chip 42. According to the above-described procedure, the processing of writing, on the image forming medium (the memory 52 in the IC chip 42 embedded in the image forming medium 11B) 11B, the electronic data for being wirelessly written is carried out.

Note that the processing of printing the printing data by the image forming unit 23a (step S26) and the processing of writing the electronic data for being wirelessly written by the radio reader/writer 23b (step S27) may be simultaneously carried out. Further, the processing of printing the printing data by the image forming unit 23a (step S26) may be carried out after the processing of writing the electronic data by the radio reader/writer 23b (step S27).

Moreover, when the history information (information showing the equipment by which scanning processing has been carried out, equipment which are the sources of supplying the printing data and the electronic data for being wirelessly written, the contents of the printing processing, and the like) and the like are recorded as additional information on the image forming medium 11B, the system control unit 21 carries out the processing of writing the information showing the contents of the processings in steps S20 to S27, and the like, as the additional information on the image forming medium 11B (step S28). Note that, when the processing of writing additional information on the image forming medium 11B is not carried out, the step S28 is omitted.

In the processing of writing the additional information, first, the system control unit 21 generates the additional information to be recorded on the original. After the additional information is generated, the system control unit 21 transmits a request for writing of the additional information, with respect to the image forming medium 11B by the radio reader/writer 23b. In response to the request for writing of the additional information, the operation control unit 51 in the IC chip 42 of the image forming medium 11B records the additional information in the memory 52 in the IC chip 42. According to the above-described procedure, the processing of writing the additional information on the image forming medium (the memory 52 in the IC chip 42 embedded in the image forming medium 11B) 11B is carried out.

According to the above-described procedure, the system control unit 21 outputs, as the result of the printing processing, the image forming medium 11B on which the processings in steps S25 to S27 have been carried out (step S29).

Note that, in step S28, as the additional information, not only the information for distinguishing the original, but also specific information designated by the user (for example, the data of the documentation software by which the original has been prepared, the digital photographic data, the address and name of the original composer, the map of a company, the sales information of a product, a message, and the like) may be recorded in the memory 52 in the IC chip 42 embedded in the image forming medium 11B.

As described above, the printer of the present embodiment has an image forming unit which prints an image on the surface of an image forming medium, and a radio communication unit which carries out radio communication with an IC chip having a radio communication function, and when image data to be printed on the image forming medium in which the IC chip having a radio communication function has been embedded is inputted, the printer prints an image based on the image data on the image forming medium by the image forming unit, and records the imaged data as electronic data in a memory in the IC chip embedded in the image forming medium, by the radio communication unit. As a result, a printer which can attach the image data as electronic data to the medium on which the image data has been printed can be provided.

Moreover, the printer of the present embodiment has a function of recording the using history and the like as additional information in the memory embedded in the image forming medium when printing processing is executed. In accordance therewith, the additional information relating to the image printed on the image forming medium, the history of the image forming medium, or the like can be easily verified. Furthermore, according to the printer of the present embodiment, the additional information can be simply recorded without printing special information on the image forming medium, or carrying out complex processing on the image forming medium.

FIGS. 6, 7, 8, 9, and 10 are flowcharts for explanation of the operations as a copying machine of the digital multi functional peripheral 1 by using the original 11A and the image forming medium 11B.

First, the user sets the original 11A at a predetermined position of the digital multi functional peripheral 1 (step S30). It will be described such that the original 11A is to be set on a predetermined original placing platform. After the original 11A is set, the user instructs a copying mode (an operational mode) by the control panel 26.

Here, the user selects, as a copying mode, whether the image data to be printed on the image forming medium 11B is made to be the optically read image data on the original 11A (image data obtained due to the optical reading unit 22a scanning the surface of the original 11A), or to be the electronic data of the original 11A (electronic data recorded in the memory 52 in the IC chip 42 embedded in the original 11A). Moreover, the user selects, as a copying mode, whether the data to be recorded in the memory 52 in the IC chip 42 embedded in the image forming medium 11B is made to be the optically read image data of the original or the electronic data of the original.

Note that, when the user designates a copying mode in which only the optically read image data of the original 11A is required, or a copying mode in which only the electronic data of the original 11A is required, it may be configured such that the system control unit 21 reads only the data designated by the user (the optically read image data or the electronic data), by the scanner 22.

The system control unit 21 sets an operational mode of the digital multi functional peripheral 1 in accordance with the copying mode instructed by using the control panel 26 by the user (step S31). After the operational mode is set, the system control unit 21 starts copying processing on the basis of an instruction of a copying start by the control panel 26 (step S32, YES). Note that, in the case of an operational mode other than the copying mode (step S32, NO), the system control unit 21 executes the other processings (step S34).

After the copying processing is started, first, the system control unit 21 determines what is the data to be recorded in the memory 52 in the IC chip 42 embedded in the image forming medium 11B, on the bases of the copying mode designated by the user (step S35). When it is determined that the data to be recorded in the IC chip 42 of the image forming medium 11B is the wirelessly read electronic data from the original 11A (step S35, wirelessly read electronic data), next, the system control unit 21 determines what is the printing data to be printed as an image on the image forming medium 11B (step S36).

When it is determined that the printing data is the optically read image data of the original 11A (step S36, optically read image data), namely, when the electronic data for being wirelessly written on the image forming medium 11B is the wirelessly read electronic data of the original 11A, and when the printing data with respect to the image forming medium 11B is the optically read image data of the original 11A, the system control unit 21 carries out processing of reading the electronic data recorded in the memory 52 in the IC chip 42 embedded in the original 11A, by the radio reader/writer 22b (step S38). The reading processing in step S38 is carried out in accordance with the procedure same as that of step S14.

The data read by the reading processing in step S38 (wirelessly read electronic data) is supplied from the scanner 22 to the system control unit 21. The system control unit 21 stores the electronic data supplied from the scanner 22, in a memory such as the HDD 24 (step S39).

Further, the system control unit 21 optically scans the image on the original 11A set at the predetermined position, by the optical reading unit 22a, and converts the image into image data (optically read image data) (step S40). The optically read image data is supplied from the scanner 22 to the system control unit 21. The system control unit 21 stores the optically read image data supplied from the scanner 22 in a memory such as the HDD 24 (step S41).

Note that the processings in steps S38 and S39 and the processings in steps S40 and S41 may be simultaneously carried out. Further, the processings in steps S38 and S39 may be carried out after the processings in steps S40 and S41.

Moreover, the system control unit 21 carries out processing in which the additional information is written on the original 11A (step S42). The reading processing in step S42 is carried out in accordance with the procedure same as that of step S18, by using the history information such as information showing equipment by which the copying processing has been carried out, the image forming medium which is to be the address of copying of the printing data and the electronic data for being wirelessly written, the contents of the copying processing, and the like, as the additional information. Note that, when the processing of writing the additional information on the original 11A is not carried out, the step S42 is omitted.

In accordance with the processings, up to step S41, with respect to the original 11A by the scanner 22, the system control unit 21 carries out processing on the image forming medium 11B by the printer 23. Here, the optically read image data stored in the HDD 24 in step S41 is used as the printing data to be printed on the space of the image forming medium 11B, and the wirelessly read electronic data stored in the HDD 24 in step S39 is used as the electronic data for being wirelessly written to be recorded in the IC chip 42 of the image forming medium 11B.

Namely, the system control unit 21 carries out the printing processing in which the image based on the optically read image data stored in the HDD 24 is formed on the image forming medium 11B, by the image forming unit 23a of the printer 23 (step S43).

Further, the system control unit 21 carries out processing in which the electronic data for being wirelessly written stored in the HDD 24 is written by the reader/writer 23b of the printer 23 in the memory 52 in the IC chip 42 embedded in the image forming medium 11B (step S44). The writing processing in step S44 is carried out in accordance with the procedure same as that of step S27.

Note that the processing in step S43 and the processing in step S44 may be simultaneously carried out, and the processing in step S43 may be carried out after the processing in step S44.

After the processing up to step S44 is completed, the system control unit 21 carries out the processing in which the additional information is written on the image forming medium 11B (step S45). The writing processing in step S45 is carried out in accordance with the procedure same as that of step S28 by using the history information such as, for example, information showing the equipment by which the copying processing has been carried out, the original which is the address of copying of the printing data and the electronic data for being wirelessly written, the contents of the copying processing, and the like, as the additional information. Note that, when the processing of writing the additional information on the image forming medium 11B is not carried out, the step S45 is omitted.

In accordance with the procedure of steps S38 to S45, the system control unit 21 prints the optically read image data of the original 11A on the space of the image forming medium 11B, and outputs the image forming medium 11B at which the electronic data and the additional information of the original 11A are recorded in the memory 52, as the result of copying (step S46).

Further, when it is determined in step S36 that the printing data is the wirelessly read electronic data of the original 11A (step S36, wirelessly read electronic data), namely, when the electronic data for being wirelessly written on the image forming medium 11B is the electronic data recorded in the IC chip 42 of the original 11A, and when the printing data on the image forming medium 11B is the wirelessly read electronic data of the original 11A, the system control unit 21 carries out processing of reading the electronic data recorded in the memory 52 in the IC chip 42 embedded in the original 11A, by the radio reader/writer 22b (step S47). The reading processing in step S47 is carried out in accordance with the procedure same as that of step S14.

The data read by the reading processing in step S47 (wirelessly read electronic data) is supplied from the scanner 22 to the system control unit 21. The system control unit 21 stores the electronic data supplied from the scanner 22 in a memory such as the HDD 24 (step S48).

Further, the system control unit 21 carries out processing in which the additional information is written on the original 11A (step S49). The writing processing in step S49 is carried out in accordance with the procedure same as that of step S18 by using the history information such as information showing the equipment by which the copying processing has been carried out, the image forming medium which is to be the address of copying of the printing data and the electronic data for being wirelessly written, the contents of the copying processing, and the like, as the additional information. Note that, when the processing of writing the additional information on the original 11A is not carried out, the step S49 is omitted.

In accordance with the processings, up to step S48, with respect to the original 11A by the scanner 22, the system control unit 21 carries out processing on the image forming medium 11B by the printer 23. Here, the wirelessly read electronic data stored in the HDD 24 in step S48 is used as the printing data and the electronic data for being wirelessly written with respect to the image forming medium 11B.

Namely, the system control unit 21 carries out printing processing in which an image based on the wirelessly read electronic data stored in the HDD 24 is formed on the image forming medium 11B, by the image forming unit 23a of the printer 23 (step S50). In addition, the system control unit 21 carries out writing processing in which the wirelessly read electronic data stored in the HDD 24 is written in the memory 52 in the IC chip 42 embedded in the image forming medium 11B (step S51). The writing processing in step S51 is carried out in accordance with the procedure same as that of step S27.

Note that the processing in step S50 and the processing in step S51 may be simultaneously carried out, and the processing in step S50 may be carried out after the processing in step S51.

Moreover, the system control unit 21 carries out the processing in which the additional information is written on the image forming medium 11B (step S52). The writing processing in step S52 is carried out in accordance with the procedure same as that of step S28 by using the history information such as, for example, information showing the equipment by which the copying processing has been carried out, the original which is the address of copying of the printing data and the electronic data for being wirelessly written, the contents of the copying processing, and the like, as the additional information. Note that, when the processing of writing the additional information on the image forming medium 11B is not carried out, the step S52 is omitted.

In accordance with the procedure of steps S47 to S52, the system control unit 21 prints the image based on the electronic data of the original 11A on the space (the surface of the image forming medium), and outputs the image forming medium 11B at which the electronic data and the additional information of the original 11A are recorded in the memory 52, as the result of copying (step S53).

When it is determined in step S35 that the data to be recorded in the memory 52 of the image forming medium 11B is the optically read image data of the original 11A (step S35, optically read image data), next, the system control unit 21 determines what is the printing data to be printed as an image on the image forming medium 11B (step S37).

When it is determined that the printing data is the wirelessly read electronic data of the original 11A (step S37, wirelessly read electronic data), namely, when the printing data to be printed on the image forming medium 11B is the wirelessly read electronic data of the original 11A, and the electronic data to be recorded in the memory 52 of the image forming medium 11B is the optically read image data of the original 11A, the system control unit 21 carries out processing of reading the electronic data recorded in the memory 52 in the IC chip 42 embedded in the original 11A, by the radio reader/writer 22b (step S54). The reading processing in step S54 is carried out in accordance with the procedure same as that of step S14.

The data read by the reading processing in step S54 (wirelessly read electronic data) is supplied from the scanner 22 to the system control unit 21. The system control unit 21 stores the wirelessly read electronic data supplied from the scanner 22 in a memory such as the HDD 24 (step S55).

Further, the system control unit 21 optically scans the image on the original 11A set at the predetermined position, by the optical reading unit 22a, and converts the image into image data (optically read image data) (step S56). The optically read image data is supplied from the scanner 22 to the system control unit 21. The system control unit 21 stores the optically read image data supplied from the scanner 22 in a memory such as the HDD 24 (step S57).

Note that the processings in steps S54 and S55 and the processings in steps S56 and S57 may be simultaneously carried out. Further, the processings in steps S54 and S55 may be carried out after the processings in steps S56 and S57.

Moreover, the system control unit 21 carries out processing in which the additional information is written on the original 11A (step S58). The reading processing in step S58 is carried out in accordance with the procedure same as that of step S18 by using the history information such as information showing the equipment by which the copying processing has been carried out, the image forming medium which is to be the address of copying of the printing data and the electronic data for being wirelessly written, the contents of the copying processing, and the like, as the additional information. Note that, when the processing of writing the additional information on the original 11A is not carried out, the step S58 is omitted.

In accordance with the processings, up to step S47, on the original 11A by the scanner 22, the system control unit 21 carries out processing on the image forming medium 11B by the printer 23. Here, the wirelessly read electronic data stored in the HDD 24 in step S54 is used as the printing data printed on the space of the image forming medium 11B, and the optically read image data stored in the HDD 24 in step S56 is used as the electronic data for being wirelessly written to be recorded in the IC chip 42 of the image forming medium 11B.

Namely, the system control unit 21 carries out printing processing in which an image based on the wirelessly read electronic data stored in the HDD 24 is formed on the image forming medium 11B, by the image forming unit 23a of the printer 23 (step S59).

Further, the system control unit 21 carries out processing in which the optically read image data stored in the HDD 24 is written, as the electronic data for being wirelessly written, in the memory 52 in the IC chip 42 embedded in the image forming medium 11B (step S60). The writing processing in step S60 is carried out in accordance with the procedure same as that of step S27.

Note that the processing in step S59 and the processing in step S60 may be simultaneously carried out, and the processing in step S59 may be carried out after the processing in step S60.

Moreover, the system control unit 21 carries out the processing in which the additional information is written on the image forming medium 11B (step S61). The writing processing in step S61 is carried out in accordance with the procedure same as that of step S28 by using the history information such as, for example, information showing the equipment by which the copying processing has been carried out, the original which is the address of copying of the printing data and the electronic data for being wirelessly written, the contents of the copying processing, and the like, as the additional information. Note that, when the processing of writing the additional information on the image forming medium 11B is not carried out, the step S61 is omitted.

In accordance with the procedure of steps S54 to S61, the system control unit 21 prints the image based on the wireless read electronic data of the original 11A on the space of the image forming medium 11B, and outputs the image forming medium 11B at which the optically read image data and the additional information of the original 11A are recorded in the memory 52 in the IC chip 42, as the result of copying (step S62).

Further, when it is determined in step S37 that the printing data is the optically read image data of the original 11A (step S37, optically read image data), namely, when both of the printing data to be printed on the space of the image forming medium 11B and the electronic data for being wirelessly written to be recorded in the IC chip 42 of the image forming medium 11B are the optically read image data of the original 11A, the system control unit 21 optically scans the image on the original 11A set at the predetermined position, by the optical reading unit 22a, and converts the image into image data (optically read image data) (step S63). The optically read image data is supplied from the scanner 22 to the system control unit 21. The system control unit 21 stores the optically read image data supplied from the scanner 22 in a memory such as the HDD 24 (step S64).

Moreover, the system control unit 21 carries out the processing in which the additional information is written on the original 11A (step S65). The writing processing in step S65 is carried out in accordance with the procedure same as that of step S18 by using the history information such as information showing the equipment by which the copying processing has been carried out, the image forming medium which it to be the address of copying of the printing data and the electronic data for being wirelessly written, the contents of the copying processing, and the like, as the additional information. Note that, when the processing of writing the additional information on the original 11A is not carried out, the step S65 is omitted.

In accordance with the processings, up to step S65, on the original 11A by the scanner 22, the system control unit 21 carries out processing on the image forming medium 11B by the printer 23. Here, the optically read image data stored in the HDD 24 in step S64 is used as the printing data on the space of the image forming medium 11B, and is used as the electronic data for being wirelessly written to be recorded in the IC chip 42 of the image forming medium 11B.

Namely, the system control unit 21 carries out printing processing in which an image based on the optically read image data stored in the HDD 24 is formed on the image forming medium 11B, by the image forming unit 23a of the printer 23 (step S66). In addition, the system control unit 21 carries out writing processing in which the optically read image data stored in the HDD 24 is written in the memory 52 in the IC chip 42 embedded in the image forming medium 11B (step S67). The writing processing in step S67 is carried out in accordance with the procedure same as that of step S27.

Note that the processing in step S66 and the processing in step S67 may be simultaneously carried out, and the processing in step S66 may be carried out after the processing in step S67.

Moreover, the system control unit 21 carries out the processing in which the additional information is written on the image forming medium 11B (step S68). The writing processing in step S68 is carried out in accordance with the procedure same as that of step S28 by using the history information such as, for example, information showing the equipment by which the copying processing has been carried out, the original which is the address of copying of the printing data and the electronic data for being wirelessly written, the contents of the copying processing, and the like, as the additional information. Note that, when the writing processing of the additional information on the image forming medium 11B is not carried out, the step S68 is omitted.

In accordance with the procedure of steps S63 to S68, the system control unit 21 prints the image based on the optically read image data of the original 11A on the space of the image forming medium 11B, and outputs the image forming medium 11B at which the optically read image data and the additional information of the original 11A are recorded in the memory 52, as the result of copying (step S69).

Note that, in steps S45, S52, S61, and S68, as the additional information, not only the information for distinguishing the original, but also the information designated by the user (for example, the data of the documentation software by which the original has been prepared, the digital photographic data, the address and name of the original composer, the map of a company, the sales information of a product, a message, and the like) may be recorded in the memory 52 in the IC chip 42 embedded in the image forming medium 11B.

As described above, the copying machine of the present embodiment has the scanner including the optical reading unit which optically scans the surface of the original and converts the image on the surface of the original into image data, and the radio communication unit which carries out radio communication with the IC chip having a radio communication function, and the printer including the image forming unit which prints an image on the surface of the image forming medium, and the radio communication unit which carries out radio communication with the IC chip having a radio communication function. The copying machine prints an image on the image forming medium by the image forming unit on the basis of the image data obtained by optically scanning the surface of the original by the optical reading unit or the electronic data recorded in the IC chip built in the original, and records the electronic data in the memory in the IC chip embedded in the image forming medium. Accordingly, a copying machine which can copy the image of the original and the electronic data relating to the original on one medium can be provided.

Moreover, the copying machine of the present embodiment has a function of recording the history information and the like as additional information in the memory embedded in the image forming medium when copying processing is executed. As a result, the additional information relating to the image printed on the image forming medium, the history of the image forming medium, and the like can be easily verified. Furthermore, according to the copying machine of the present embodiment, the additional information can be simply recorded without printing special information on the surface of the image forming medium, or carrying out complex processing on the image forming medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A copying machine comprising:
   an optical reading unit which optically scans a surface of a recording medium, and converts an image on the surface of the recording medium into image data;

a first radio communication unit which reads image data from an IC chip embedded in the recording medium;

an image forming unit which prints an image on a surface of an image forming medium;

a control panel which allows a user to select an image to be printed on the surface of the image forming medium from one of the image on the surface of the recording medium and the image data recorded in the IC chip which is embedded in the recording medium;

a second radio communication unit which writes data on an IC chip embedded in the image forming medium and having a radio communication function;

an operational mode setting unit which sets one of the image data of the recording medium acquired by the optical reading unit and the data read from the IC chip of the recording medium by the first radio communication unit, as the data to be printed as the image on the image forming medium by the image forming unit, in accordance with the user's selection input to the control panel; and a control unit which is configured to:

when the operational mode setting unit sets the image to be printed on the surface of the image forming medium as the image that is recorded in the IC chip of the recording medium, control the first radio communication unit to read the image from the IC chip of the recording medium, and the image forming unit to print the image read by the first radio communication unit on the image forming medium;

when the operational mode setting unit sets the image to be printed on the surface of the image forming medium as the image that is on the surface of the recording medium, control the optical reading unit to read the image on the surface of the recording medium, and the image forming unit to print the image read by the optical reading unit on the surface of the image forming medium;

when the operational mode setting unit sets the image data to be recorded in the IC chip of the image forming medium as the image data that is recorded in the IC chip of the recording medium, control the first radio communication unit to read the image from the IC chip of the recording medium, and the second radio communication unit to record the image that is read by the first radio communication unit in the IC chip of the image forming medium; and when the operational mode setting unit sets the image data to be recorded in the IC chip of the image forming medium as the image data that is read from the surface of the recording medium, control the optical reading unit to read the image data on the surface of the recording medium, and the second radio communication unit to record the image data that is read by the optical reading unit in the IC chip of the image forming medium, wherein:

the control panel allows a user to select image data to be recorded in the IC chip embedded in the image forming medium from one of the image data which is read from the surface of the recording medium and the image data recorded in the IC chip which is embedded in the recording medium;

the operational mode setting unit sets one of the image data of the recording medium acquired by the optical reading unit and the data read from the IC chip of the original by the first radio communication unit, as the data to be written on the IC chip embedded in the image forming medium by the first radio communication unit, in accordance with the user's selection input to the control panel.

2. The copying machine according to claim 1, further comprising:

a scanner unit which includes the optical reading unit and the first radio communication unit;

a printer which includes the image forming unit; and a system controller which includes the operational mode setting unit and the control unit, wherein the control panel, the scanner unit, the printer, and the system controller constitute an integrally formed copying machine.

3. The copying machine according to claim 1, further comprising:

a scanner unit which includes the optical reading unit and the first radio communication unit;

a printer which includes the image forming unit, and the second radio communication unit;

a system controller which includes the operational mode setting unit and the control unit, wherein the control panel, the scanner unit, the printer, and the system controller constitute an integrally formed apparatus.

4. The copying machine according to claim 1, wherein the radio reader reads electronic data, which corresponds to the image data recorded on the surface of the recording medium, from the IC chip embedded in the recording medium.

5. The copying machine according to claim 2, wherein the radio reader reads electronic data, which corresponds to the image data recorded on the surface of the recording medium, from the IC chip embedded in the recording medium.

6. The copying machine according to claim 3, wherein the radio reader reads electronic data, which corresponds to the image data recorded on the surface of the recording medium, from the IC chip embedded in the recording medium.

7. The copying machine according to claim 1, wherein:

the control unit generates history information based on contents of processing, and the second radio communication unit writes the history information generated by the control unit in the IC chip of the image forming medium.

8. The copying machine according to claim 1, wherein:

the first radio communication unit and the second radio communication unit constitute one communication unit.

9. The copying machine according to claim 1, wherein:

when the operational mode setting unit sets the image to be printed on the surface of the image forming medium as the image that is on the surface of the recording medium, and the image data to be recorded in the IC chip of the image forming medium as the image that is recorded in the IC chip of the recording medium, the control unit is configured to:

control the optical reading unit to read the image data on the surface of the recording medium, and the first radio communication unit to read the image from the IC chip of the recording medium; and control the image forming unit to print the image data that is read by the optical reading unit on the surface of the image forming medium, and the second radio communication unit to record the image data that is read by the first radio communication unit in the IC chip of the image forming medium.

10. The copying machine according to claim 1, wherein:

when the operational mode setting unit sets the image to be printed on the surface of the image forming medium as the image that is recorded in the IC chip of the recording medium, and the image data to be recorded in the IC chip of the image forming medium as the image that is recorded in the IC chip of the recording medium, the control unit is configured to:
control the first radio communication unit to read the image from the IC chip of the recording medium; and control the image forming unit to print the image data that is read by the first radio communication unit on the surface of the image forming medium, and the second radio communication unit to record the image data that is read by the first radio communication unit in the IC chip of the image forming medium.

11. The copying machine according to claim 1, wherein:
when the operational mode setting unit sets the image to be printed on the surface of the image forming medium as the image that is on the surface of the recording medium, and the image data to be recorded in the IC chip of the image forming medium as the image that is on the surface of the recording medium, the control unit is configured to:
control the optical reading unit to read the image data that is on the surface of the recording medium; and control the image forming unit to print the image data that is read by the optical reading unit on the surface of the image forming medium, and the second radio communication unit to record the image data that is read by the optical reading unit in the IC chip of the image forming medium.

12. A method of copying an image on a surface of a recording medium, comprising:
optically scanning, by an optically scanning unit, the surface of the recording medium, and converting an image on the surface of the recording medium into image data;

reading, by a first radio communication unit, image data from an IC chip embedded in the recording medium;

printing, by an image forming unit, an image on a surface of an image forming medium;

receiving a selection made by a user onto a control panel, the selection corresponding to an image to be printed on the surface of the image forming medium from one of the image on the surface of the recording medium and the image data recorded in the IC chip which is embedded in the recording medium;

setting one of the image data of the recording medium acquired by the optically scanning step and the data read from the IC chip of the recording medium by the first radio communication unit, as the data to be printed as the image on the image forming medium by the image forming unit, in accordance with the user's selection input to the control panel;

controlling, when the setting step sets the image to be printed on the surface of the image forming medium as the image that is recorded in the IC chip of the recording medium, the first radio communication unit to read the image from the IC chip of the recording medium, and controlling the image forming unit to print the image read by the first radio communication unit on the image forming medium;

controlling, when the operational mode setting unit sets the image to be printed on the surface of the image forming medium as the image that is on the surface of the recording medium, the optical reading unit to read the image on the surface of the recording medium, and controlling the image forming unit to print the image read by the optical reading unit on the surface of the image forming medium;

writing, by a second radio communication unit having a radio communication function, data on an IC chip embedded in the image forming medium, wherein:

receiving a selection made by the user onto the control panel, image data to be recorded in the IC chip embedded in the image forming medium from one of the image data which is read from the surface of the recording medium and the image data recorded in the IC chip which is embedded in the recording medium;

setting, by the operational mode setting unit, one of the image data of the recording medium acquired by the optical reading unit and the data read from the IC chip of the original by the first radio communication unit, as the data to be written on the IC chip embedded in the image forming medium by the first radio communication unit, in accordance with the user's selection input to the control panel;

controlling, when the operational mode setting unit sets the image data to be recorded in the IC chip of the image forming medium as the image data that is recorded in the IC chip of the recording medium, the first radio communication unit to read the image from the IC chip of the recording medium, and controlling the second radio communication unit to record the image that is read by the first radio communication unit in the IC chip of the image forming medium; and controlling, when the operational mode setting unit sets the image data to be recorded in the IC chip of the image forming medium as the image data that is read from the surface of the recording medium, the optical reading unit to read the image data on the surface of the recording medium, and controlling the second radio communication unit to record the image data that is read by the optical reading unit in the IC chip of the image forming medium.

13. The method according to claim 12, further comprising:
generating history information based on contents of processing; and writing, by the first radio communication unit, the history information generated by the generating step in the IC chip of the recording medium.

14. The method according to claim 12, further comprising:
generating history information based on contents of processing; and writing, by the second radio communication unit, the history information generated by the control unit in the IC chip of the image forming medium.

15. The method according to claim 12, wherein:
the first radio communication unit and the second radio communication unit constitute one communication unit.

16. The method according to claim 12, further comprising:
setting, by the operational mode setting unit, the image to be printed on the surface of the image forming medium as the image that is on the surface of the recording medium, and the image data to be recorded in the IC chip of the image forming medium as the image that is recorded in the IC chip of the recording medium;

controlling the optical reading unit to read the image data on the surface of the recording medium, and the first radio communication unit to read the image from the IC chip of the recording medium; and controlling the image forming unit to print the image data that is read by the optical reading unit on the surface of the image forming medium, and the second radio communication unit to record the image data that is read by the first radio communication unit in the IC chip of the image forming medium.

17. The method according to claim 12, wherein:

setting, by the operational mode setting unit, the image to be printed on the surface of the image forming medium as the image that is recorded in the IC chip of the recording medium, and the image data to be recorded in the IC chip of the image forming medium as the image that is recorded in the IC chip of the recording medium;

controlling the first radio communication unit to read the image from the IC chip of the recording medium; and controlling the image forming unit to print the image data that is read by the first radio communication unit on the surface of the image forming medium, and the second radio communication unit to record the image data that is read by the first radio communication unit in the IC chip of the image forming medium.

\* \* \* \* \*